United States Patent [19]

Ali

[11] Patent Number: 4,838,446

[45] Date of Patent: Jun. 13, 1989

[54] WIND SHIELD FOR CHAFING DISH BURNER

[76] Inventor: George Ali, 25 W. Grand Ave., Montvale, N.J. 07645

[21] Appl. No.: 86,071

[22] Filed: Aug. 17, 1987

[51] Int. Cl.[4] ............................................. B65D 47/00
[52] U.S. Cl. ................................................... 220/85 R
[58] Field of Search .............. 220/4 R, 4 F, 83, 85 R; 428/603

[56] References Cited

U.S. PATENT DOCUMENTS 1,582,541  4/1926  Ringer ................................. 220/4 R
1,761,137  6/1930  Louden ........................... 428/603 X Primary Examiner—Steven M. Pollard
Attorney, Agent, or Firm—Samuelson & Jacob

[57] ABSTRACT

A wind shield for shielding an open-flame heater, such as an alcohol burner, used in connection with warm food serving apparatus, such as a chafing dish, includes first and second barrier walls joined together in a unitary L-shaped structure which is self-supporting along an edge thereof when placed adjacent the heater so as to provide a barrier against spurious drafts which otherwise might extinguish the flame of the heater.

8 Claims, 1 Drawing Sheet

WIND SHIELD FOR CHAFING DISH BURNER

The present invention relates generally to open-flame heating devices and pertains, more specifically, to shields for guarding against unwanted extinction of the flame of a burner, such as a burner used in connection with a chafing dish, by a spurious draft or breeze.

The serving of food at various gatherings often requires the use of heating devices to maintain the desired elevated temperature in those foods which are to be served warm. Chafing dishes commonly are used at such gatherings to maintain the desired elevated temperature. Ordinarily, the chafing dish is supported above a table top, or a like support surface, and an open-flame heater, such as an alcohol burner, is placed beneath the chafing dish to keep the contents of the chafing dish warm. When these gatherings are held in environments where the chafing dish is subjected to wind, or other errant breezes, the open flame of the burner is susceptible to being blown out, or extinguished, by a spurious draft. The likelihood of such an occurrence places an additional burden of vigilance and maintenance upon the personnel responsible for the food service. As a result, various guards and shields have been made available for use in connection with open-flame heaters in order to reduce the incidents of loss of flame and consequent loss of heat. The present invention provides an improvement in such shields, the improvement being especially well-suited for use by food service organizations and by professional caterers who require compact, easily transported equipment which not only is economical and effective, but which also is aesthetically pleasing.

The present invention provides a wind shield for open-flame burners, such as those used in connection with chafing dishes, and exhibits a number of objects and advantages, some of which may be summarized as follows: Effective operation combined with exceptional simplicity in both construction and use; an aesthetically pleasing construction which adds to the appearance of a chafing dish setting; a structure which enables compact storage and transportation of any number of shields for use in the field; increased efficiency in the heating of the chafing dish as a result of a reduction of the dissipation of heat from the burners and confinement of the heat, enabling better heat retention beneath the chafing dish, while still allowing sufficient airflow to the burners; and a rugged construction which will withstand the rigors of storage, transportation and use by professional caterers and food service organizations over a long service life.

The above objects and advantages, as well as further objects and advantages, are attained by the present invention which may be described briefly as a wind shield for shielding the burner of a chafing dish from spurious drafts which otherwise might extinguish the flame of the burner, the chafing dish having a longitudinal length and a lateral width and being supported in a position spaced altitudinally above a support surface with the burner placed beneath the chafing dish, the wind shield comprising: a first wall extending longitudinally and having altitudinally opposed edges extending longitudinally between opposite ends, an obverse surface and a reverse surface; a second wall extending laterally and having altitudinally opposed edges extending laterally between opposite ends, an obverse surface and a reverse surface; the first and second walls being joined at confronting ends to establish an integral structure having a generally L-shaped edge configuration, the structure being self-supporting in an erect position resting along corresponding longitudinal and lateral edges upon the support surface with the obverse and reverse surfaces oriented altitudinally such that the walls are placed adjacent the corresponding space between the chafing dish and the support surface and the burner is placed behind the reverse surfaces to be shielded by the walls from the spurious drafts.

The invention will be understood more fully, while still further objects and advantages will become apparent, in the following detailed description of a preferred embodiment of the invention illustrated in the accompanying drawing, in which.

Figure 1:
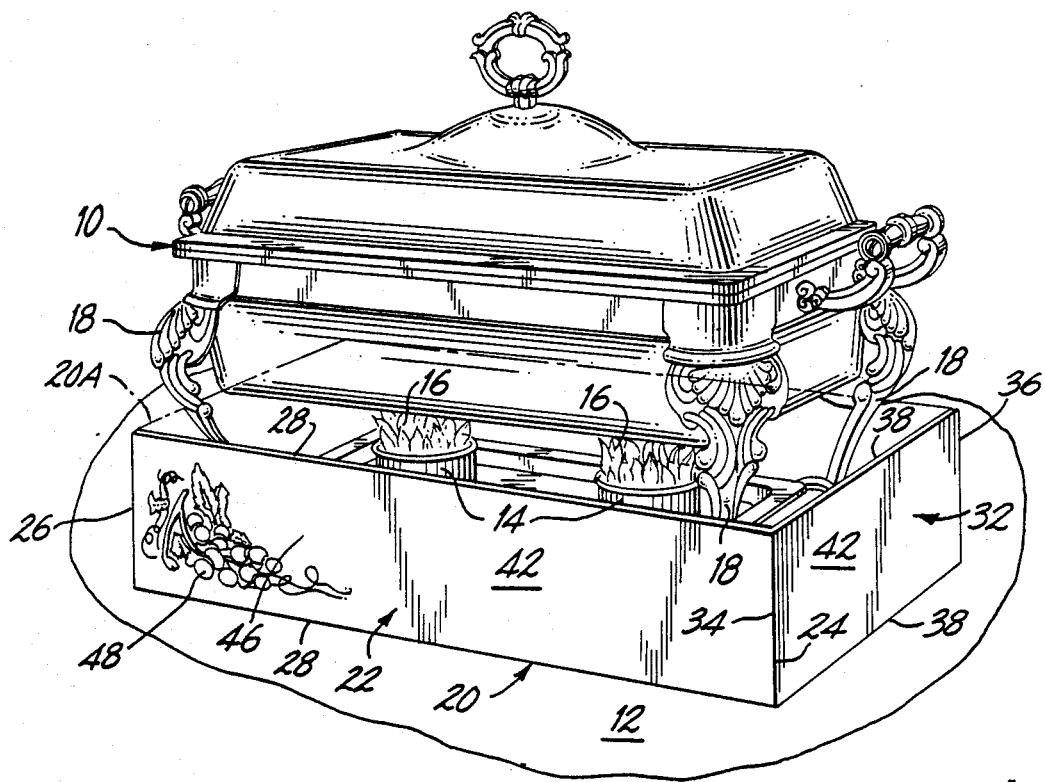
FIG. 1 is a pictorial view of a chafing dish setting utilizing a wind shield constructed in accordance with the present invention.

Referring now to the drawing, and especially to FIG. 1 thereof, a chafing dish 10 is shown placed upon a support surface 12, such as a table top or the like, for the presentation and service of warm food. In order to maintain the food in the chafing dish at the desired elevated temperature, burners 14 are placed beneath the chafing dish 10, as shown. Burners 14 are of the type which heat with an open flame 16, such as a commonly available alcohol burner. Chafing dish 10 includes a plurality of legs 18 which elevate the bottom of the chafing dish altitudinally above the support surface 12 to accommodate the placement of the burners 14 beneath the chafing dish.

Figure 2:
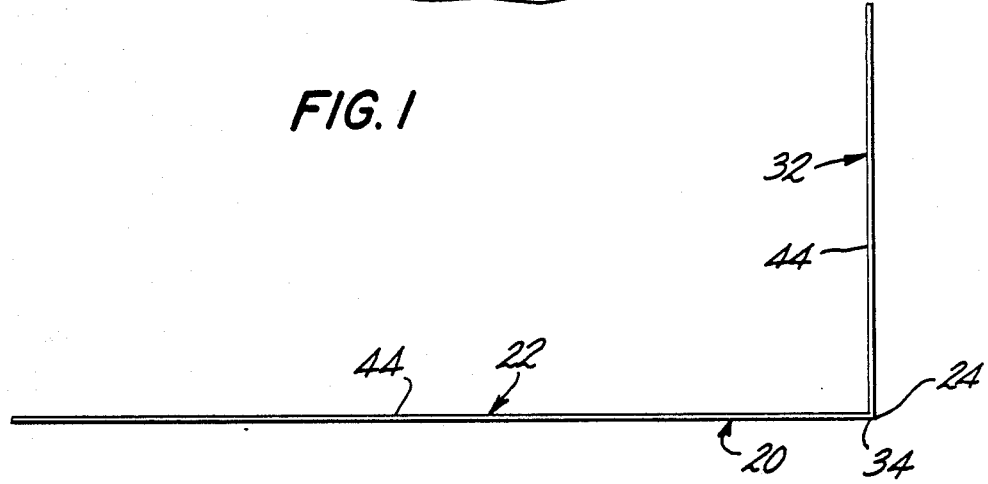
FIG. 2 is a top plan view of the wind shield of FIG. 1.

In many settings, chafing dishes are placed in an environment where the open-flame burners are susceptible to being extinguished by an errant breeze which can blow out the flame of the burner. That possibility is a continual source of annoyance, requiring constant vigilance on the part of service personnel who must tend the stations where the chafing dishes are set. In order to guard against such an occurrence, the present invention provides a wind shield 20 which serves as a barrier to preclude extinction of the open flame 16 of a burner 14 by a spurious draft. Wind shield 20 includes a first wall 22 extending longitudinally between opposite ends 24 and 26 and having altitudinally opposed edges 28 extending longitudinally between the opposite ends 24 and 26, and a second wall 32 extending laterally between opposite ends 34 and 36 and having altitudinally opposed edges 38 extending laterally between the opposite ends 34 and 36. The walls 22 and 32 are joined at the confronting ends 24 and 34 to establish an integral structure having a generally L-shaped edge configuration, as illustrated in FIG. 2. In the illustrated embodiment, wind shield 20 is a unitary structure formed from a single sheet of metal, such as stainless steel, bent along the intersection of the ends 24 and 34 into a right angle configuration in which walls 22 and 24 extend perpendicular to one another.

Upon placement of the wind shield 20 with the corresponding edges 28 and 38 resting upon the support surface 12, the walls 22 and 32 of the wind shield are placed adjacent the spacing between the chafing dish 10 and the support surface 12 to establish a barrier which protects against extinction of the flames 16 by a spurious draft. The L-shaped configuration of the wind shield 20 renders the wind shield self-supporting in the altitudinally erect position shown in FIG. 1. Since undesirable errant breezes usually emanate from a single direction, it generally is sufficient to erect a barrier along only that direction. The L-shaped configuration of wind shield 20 is capable of being oriented in order to provide that barrier. Thus, a full four-walled barrier is not always necessary and the two-walled barrier provided by the present wind shield 20 is effective for almost all settings. However, should it be necessary to provide a full four-walled barrier, a second wind shield can be placed adjacent the first wind shield 20, as illustrated in phantom at 20A in FIG. 1, to close off the flames 16 from drafts in all four directions. Whether the barrier is two-walled or four-walled, wind shield 20 also serves to increase the heating efficiency of burners 14 by reducing dissipation of the heat and confining the heat of the burners 14 for better heat retention beneath the chafing dish 20, while still allowing sufficient airflow to the burners 14.

Figure 3:
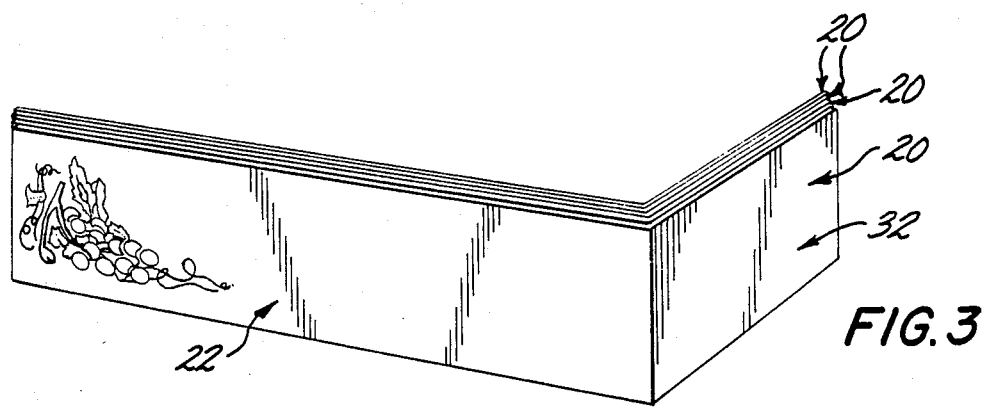
FIG. 3 is a perspective view of a plurality of wind shields nested for storage or transportation.

As best illustrated in FIG. 3, the L-shaped configuration of wind shield 20 is especially well-suited for use by professional caterers and food service organizations since the configuration enables a plurality of wind shields 20 to be nested for compact storage and transportation. Thus, the L-shaped configuration enables an unlimited number of wind shields to be placed in closely associated nested arrangement for the maximum conservation of space. The simple, rugged construction of wind shield 20 renders the wind shield economical to manufacture and use over a very long service life.

Returning now to FIGS. 1 and 2, each wall 22 and 32 of the wind shield 20 has an obverse surface 42 and a reverse surface 44, both of which surfaces are oriented altitudinally when the wind shield 20 is in place. The burners 14 are located behind the reverse surfaces 44, while the obverse surfaces 42 are highly visible when a wind shield 20 is used in connection with a chafing dish 10 in any particular setting. In the preferred embodiment, the obverse surfaces 42 and the reverse surfaces 44 are flat and planar. Thus, at least one of the obverse surfaces 42 provides a visible display area 46 upon which a logo or other decoration 48 may be placed. In this manner the wind shield 20 not only provides an aesthetically pleasing appearance, but serves as a vehicle for placing the name of the caterer or other professional food service organization on prominent display.

It will be seen that wind shield 20 provides an exceptionally simple and economical solution to the problem of coping with spurious drafts which might otherwise extinguish the flame of an open-flame heater used in connection with such apparatus as chafing dishes in the service of food at a desired elevated temperature. Wind shield 20 is especially well-suited for use by professional caterers and food service organizations in that large numbers of wind shields can be stored or transported in a minimum space. Moreover, wind shield 20 provides an aesthetically pleasing finished appearance to a chafing dish setting, while enabling the display of information identifying the particular food service professional responsible for the food service.

It is to be understood that the above detailed description of a preferred embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. The combination which includes a chafing dish having a burner and a wind shield for shielding the burner of the chafing dish from spurious drafts which otherwise might extinguish the flame of the burner, the wind shield being capable of nesting with a like wind shield for compact storage and transportation of multiple wind shields, the chafing dish having a longitudinal length and a lateral width and being supported in a position spaced altitudinally above a support surface with the burner placed beneath the chafing dish, and the windshield comprising:

a first wall extending longitudinally and having altitudinally opposed edges extending longitudinally between opposite ends, an obverse surface on the first wall and contiguous with at least one of the opposed edges and a reverse surface on the first wall and contiguous with said one of the opposed edges; and a second wall extending laterally and having altitudinally opposed edges extending laterally between opposite ends, an observe surface on the second wall and contiguous with at least one of the opposed edges of the second wall and a reverse surface on the second wall and contiguous with said one of the opposed edges of the second wall, said one of the opposed edges of the second wall corresponding to said one of the opposed edges of the first wall;

the first and second walls being joined at confronting ends to establish an integral structure having a generally L-shaped edge configuration, the structure being self-supporting in an erect position resting along corresponding longitudinal and lateral edges upon the support surface with the obverse and reverse surfaces oriented altitudinally such that when the wind shield is in use the walls are placed adjacent the corresponding space between the chafing dish and the support surface and the burner is placed behind the reverse surfaces to be shielded by the walls from the spurious drafts; and the obverse surfaces, the reverse surfaces and the said ones of the opposed edges of the first and second walls being arranged such that upon said nesting of the wind shield with the like wind shield, the reverse surfaces of one of the nested wind shields will be contiguous with the corresponding obverse surfaces of the other of the nested wind shields for compact storage and transportation of said multiple wind shields.

2. The invention of claim 1 wherein the first and second walls are unitary with one another.

3. The invention of claim 1 wherein the obverse surface and the reverse surface of each wall are generally parallel to one another.

4. The invention of claim 1 wherein the first and second walls are essentially perpendicular to one another.

5. The invention of claim 4 wherein the first and second walls are unitary with one another.

6. The invention of claim 5 wherein the obverse and reverse surfaces are generally planar.

7. The invention of claim 6 wherein the obverse surface and the reverse surface of each wall are generally parallel to one another.

8. The invention of claim 7 wherein the obverse surface of at least the first wall includes a visible display area.

* * * * *